United States Patent
Leong et al.

(10) Patent No.: US 10,944,552 B2
(45) Date of Patent: Mar. 9, 2021

(54) COMMUNICATION DEVICES AND ASSOCIATED METHOD

(71) Applicant: NXP B.V., Eindhoven (NL)

(72) Inventors: Frank Leong, Veldhoven (NL); Hugues Jean Marie De Perthuis, Garcelles (FR); Wolfgang Küchler, Graz (AT)

(73) Assignee: NXP B.V., Eindhoven (NL)

(*) Notice: Subject to any disclaimer, the term of this patent is extended or adjusted under 35 U.S.C. 154(b) by 175 days.

(21) Appl. No.: 16/013,783

(22) Filed: Jun. 20, 2018

(65) Prior Publication Data

US 2019/0013937 A1    Jan. 10, 2019

(30) Foreign Application Priority Data

Jul. 5, 2017    (EP) .................................... 17305870

(51) Int. Cl.
*H04L 9/08*    (2006.01)
*H04L 29/06*    (2006.01)
(Continued)

(52) U.S. Cl.
CPC .......... *H04L 9/0825* (2013.01); *H04L 9/0861* (2013.01); *H04L 9/16* (2013.01);
(Continued)

(58) Field of Classification Search
CPC ....... H04L 9/0825; H04L 63/04; H04L 63/06; H04L 9/0861; H04L 9/16; H04L 9/3228;
(Continued)

(56) References Cited

U.S. PATENT DOCUMENTS 7,852,768 B1 * 12/2010 Pannell .................. H04L 49/65
370/235
9,032,501 B1 * 5/2015 Martin ................. H04L 9/3213
726/10
(Continued)

FOREIGN PATENT DOCUMENTS

EP    3091710 A1 *    11/2016    ............ H04W 76/10

OTHER PUBLICATIONS

IP.com Search Query; Apr. 11, 2020 (Year: 2020).*
(Continued)

*Primary Examiner* — Samson B Lemma
*Assistant Examiner* — Blake I Narramore
(74) *Attorney, Agent, or Firm* — Rajeev Madnawat

(57) ABSTRACT

A method for operating system to transmit a plurality of frames from a first communication device to a second communication device is disclosed. The method incudes generating a security-sequence using a security-sequence-counter-value, changing the security-sequence-counter-value to a new security-sequence-counter-value; encrypting, at the first communication device, the security-sequence using a first-derived-session-key to provide an encrypted-security-sequence-counter-value; providing, at the first communication device, a frame comprising the security-sequence and encrypted-security-sequence-counter-value, transmitting a first-type frame from the first communication device to the second communication device, decrypting the encrypted-security-sequence-counter-value using the first-derived-session-key to provide the security-sequence-counter-value, configuring a security-sequence detector to detect a security-sequence using the security-sequence-counter-value, setting a key-validity-counter-value in accordance with the number of first-type frames transmitted since the first-derived-session-key was updated; and updating the
(Continued)

first-derived-session-key based on a master-session-key in response to the key-validity-counter-value reaching an update value.

13 Claims, 9 Drawing Sheets

(51) Int. Cl.
    *H04W 12/10* (2021.01)
    *H04W 12/04* (2021.01)
    *H04L 9/16* (2006.01)
    *H04L 9/32* (2006.01)
    *H04W 12/02* (2009.01)

(52) U.S. Cl.
    CPC ............ *H04L 9/3228* (2013.01); *H04L 63/04* (2013.01); *H04L 63/0442* (2013.01); *H04L 63/0464* (2013.01); *H04L 63/06* (2013.01); *H04L 63/067* (2013.01); *H04W 12/04* (2013.01); *H04W 12/10* (2013.01); *H04W 12/02* (2013.01)

(58) Field of Classification Search
    CPC ............ H04L 63/0442; H04L 63/0464; H04L 63/067; H04W 12/10; H04W 12/04; H04W 12/02
    See application file for complete search history.

(56) References Cited

U.S. PATENT DOCUMENTS

| | | | | |
|---|---|---|---|---|
| 2001/0007127 | A1* | 7/2001 | Staring | H04L 9/12 713/160 |
| 2003/0208677 | A1* | 11/2003 | Ayyagari | H04L 63/065 713/168 |
| 2004/0103282 | A1* | 5/2004 | Meier | G06Q 20/3674 713/171 |
| 2006/0062393 | A1 | 3/2006 | Hsu et al. | |
| 2008/0151967 | A1* | 6/2008 | Fullerton | G01S 7/4052 375/145 |
| 2009/0147719 | A1* | 6/2009 | Kang | H04L 12/189 370/312 |
| 2009/0240944 | A1 | 9/2009 | Cho et al. | |
| 2009/0254750 | A1* | 10/2009 | Bono | H04L 9/0822 713/170 |
| 2010/0199091 | A1* | 8/2010 | Ho | H04L 9/0637 713/168 |
| 2013/0077781 | A1* | 3/2013 | Daemen | H04L 9/0861 380/44 |
| 2013/0230173 | A1* | 9/2013 | Hori | H04L 9/0891 380/281 |
| 2014/0080522 | A1* | 3/2014 | Johnson | H04W 4/023 455/456.3 |
| 2015/0033016 | A1* | 1/2015 | Thornton | H04L 63/061 713/171 |
| 2016/0232523 | A1* | 8/2016 | Venot | G06Q 20/3223 |
| 2016/0234008 | A1 | 8/2016 | Hekstra et al. | |
| 2016/0261411 | A1* | 9/2016 | Yau | G06F 21/445 |
| 2016/0301669 | A1* | 10/2016 | Muma | H04L 63/0428 |
| 2016/0352605 | A1 | 12/2016 | O'Donoghue et al. | |
| 2017/0359134 | A1 | 12/2017 | Baier et al. | |
| 2018/0275268 | A1 | 9/2018 | Reisinger et al. | |

OTHER PUBLICATIONS

Lin, J. "Defining the ultimate rugged PC: Nuts, bolts, and bits", VIA Technologies, Inc., 3 pgs., retrieved from the internet Mar. 16, 2020 at: URL:http://mil-embedded.com/pdfs/VIATech.Mar08.pdf (Apr. 1, 2008).

Jiang, Y. et al. "An Asymmetric Double Sided Two-Way Ranging for Crystal Offset", International Symposium on Signals, Systems and Electronics, Montreal, Que., pp. 525-528 (2007).

King L. J. et al. "Symmetric Double Side Two Way Ranging with Unequal Reply Time", IEEE 66th Vehicular Technology Conference, Baltimore, MD, pp. 1980-1983 (2007).

IEEE Computer Society, "IEEE Standard for Low-Rate Wireless Personal Area Networks (WPANs)", IEEE Std 802.15.4™-2015 (Revision of IEEE Std 802.15.4-2011), LAN/MAN Standards Committee, pp. 1-709 (2015).

Chen, L. "NIST Special Publication 800-108," Recommendation for Key Derivation Using Pseudorandom Functions, National Institute of Standards and Technology, pp. 1-21 (Oct. 2009).

* cited by examiner

COMMUNICATION DEVICES AND ASSOCIATED METHOD

CROSS-REFERENCE TO RELATED APPLICATIONS

This application claims the priority under 35 U.S.C. § 119 of European Patent application no. 17305870.2, filed on Jul. 5, 2017, the contents of which are incorporated by reference herein.

The present disclosure relates to a method for communicating between a first communication device and second communication device and in particular, although not exclusively, to a method for performing ranging between a first communication device and second communication device.

Some communications systems provide a first communication device, or tag/token, that is paired with a set of second communication devices, or anchors. The tag may encrypt messages to the anchors to prevent third parties using these messages to track the tag.

Such schemes may be provided in the context of low-power Internet-of-Things (IoT) technologies.

Some communication systems may be used for ranging applications, such as passive key-less entry systems in the automotive industry. In some RF Ranging systems, it is desirable to maximize security and link budget while minimizing current consumption, latency, and system cost.

According to a first aspect of the present disclosure there is provided a first communication device comprising:
  a first transmitter module configured to transmit first-type frames, each first-type frame comprising:
    a security-sequence; and
    an encrypted-security-sequence-counter-value, and
  a security-module configured to:
    generate the security-sequence for each frame using a security-sequence-counter-value, in which a different security-sequence-counter-value is used for each frame;
    derive a first-derived-session-key based on a master-session-key using a first-key-derivation-function in response to a key-validity-counter-value reaching an update value; and
    encrypt the security-sequence to provide the encrypted-security-sequence-counter-value using the first-derived-session-key.

According to a further aspect of the present disclosure there is provided a second communication device comprising:
  a first receiver module configured to receive first-type frames, each first-type frame comprising:
  a security-sequence generated using a security-sequence-counter-value, in which the security-sequence-counter-value is different for each frame; and
  an encrypted-security-sequence-counter-value, and
  a security-module configured to:
    derive a first-derived-session-key based on a master-session-key using a first-key-derivation-function in response to a key-validity-counter-value reaching an update value; and
    decrypt the encrypted-security-sequence-counter-value of each frame to provide a security-sequence-counter-value using the first-derived-session-key.

According to one or more embodiments, the security-module of either or both of the first communication device or the second communication device is configured to set the key-validity-counter-value in accordance with the number of first-type frames transmitted since the first-derived-session-key was updated.

In one or more embodiments, the security-module of either or both of the first communication device or the second communication device is configured to maintain the key-validity-counter-value by incrementing a key-validity-counter in response to the transmission of each frame. The first-derived-session-key may be generated by the security-module of both of the first communication device or the second communication device based on a common key derivation function and a first-derived-session-key-index-value maintained by the respective communication modules.

In one or more embodiments, the security-module of either or both of the first communication device or the second communication device is configured to generate a synchronisation flag in response to the key-validity-counter-value reaching the update value. The first or second communication device may be configured to transmits a first-derived-session-key update signal in response to the setting of the synchronisation flag in order to enable synchronisation of updating the first-derived-session-key in the first and second devices. The first-derived-session-key update signal may be transmitted by Bluetooth, such as Bluetooth 5 or BLE.

In one or more embodiments, the update value is set at a number of frames such that the first-derived-session-key is secure in each frame. The update value may be set at a value at which security is guaranteed.

In one or more embodiments, the update value is set at a number of frames that is greater than a value for which the first-derived-session-key is secure in each frame. The update value may be set at a value at which security is not guaranteed.

Also disclosed is a first communication device comprising:
  a first transmitter module configured to transmit first-type frames, each first-type frame comprising:
    a security-sequence; and
    an encrypted-security-sequence-counter-value, and
  a security-module configured to:
    generate the security-sequence for each frame using a security-sequence-counter-value, in which a different security-sequence-counter-value is used for each frame;
    encrypt, for each frame, the security-sequence to provide the encrypted-security-sequence-counter-value using an encryption-key.

Also disclosed is a second communication device comprising:
  a first receiver module configured to receive first-type frames, each first-type frame comprising:
  a security-sequence generated using a security-sequence-counter-value, in which the security-sequence-counter-value is different for each frame; and
  an encrypted-security-sequence-counter-value, and
  a security-module configured to:
    decrypt, for each frame, the encrypted-security-sequence-counter-value of each frame to provide a security-sequence-counter-value using an encryption-key. The encryption key used by the first and second communication devices may be a common or shared encryption key.

In a further aspect there is provided a system comprising:
a first communication device as disclosed herein; and
a plurality of second communication devices as disclosed herein, in which the first and second communication devices are configured to engage in exchanges, each exchange comprising:

the first communication device transmitting a request first-type frame to the plurality of second communication devices, one or more of the second communication devices receiving the request first-type frame and, in response to receiving the request first-type frame, transmitting a first response first-type frame to the first communication device, the first communication device transmitting a second response first-type frame in response to receiving the or each first response first-type frame, in which each first-type frame comprises a synchronisation portion, a start frame delimiter, the security-sequence and a data payload comprising the encrypted-security-sequence-counter-value. The first communication device may transmit a second response first-type frame to the plurality of second communication devices in response to receiving each first response first-type frame. Each second-type frame may comprise a synchronisation portion, a start frame delimiter and a data payload. The first communication device may communicate with the plurality of communication devices sequentially or in parallel.

In one or more embodiments, the security-module of each of the first and second communication devices is configured to derive a second-derived-session-key based on the master-session-key using a second-key-derivation-function. The second-key-derivation-function may be different to the first-key-derivation-function. The second-key-derivation-function may be different to the first-key-derivation-function in that it takes a different index value to the first-key-derivation-function. The security-module of the first communication device may be configured to encrypt time stamp information in the data payload of the second-type frames using the second-derived-session-key. The security-module of the second communication device may be configured to decrypt information in the data payload of the second-type frames using the second-derived-session-key. The information may be time stamp information.

In one or more embodiments, the first and second communication devices are configured to synchronise updating of the first-derived-session-key in response to the key-validity-counter-value reaching an update value. Synchronisation may be achieved over the same or a different communication channel to the communication of first-type frames and second-type frames.

In one or more embodiments, the first and second communication devices are configured to conduct a dummy exchange or a plurality of dummy exchanges following initiation of updating of the first-derived-session-key. Ranging information from the dummy exchange may be discarded by the first and second communication devices. One or more dummy exchanges may be performed in a guard time slot to provide time for the first and second devices to update their respective first-derived-session-keys.

In one or more embodiments, the second communication devices are provided in a network. The dummy exchange may comprise a dummy second-type frame having an identifier signifying the one or more of the second device which have transmitted a first response first-type frame to the first communication device in the dummy exchange. The second communication devices may be configured to synchronise the first-derived-session-key over the network so that a current first-derived-session-key or current first-derived-session-key-index is provided to any of the plurality of second devices associated with a first response first-type frame that has not been received by the first device.

In one or more embodiments, the first-type frames and second-type frames are impulse radio ultra-wide band, IR-UWB, frames. The synchronisation of the first-derived-session keys may be conducted over Bluetooth or IR-UWB. The first and second communication devices may be ranging devices. The system may be a ranging system. The system may be a passive keyless entry or other access system. There may be provided a vehicle comprising the passive keyless entry system. The first communication device and second communication device may use Bluetooth Low Energy communication to determine whether the first device is proximal to the second device before initiating IR-UWB communication.

In a further aspect there is provided a method for operating system to transmit a plurality of frames from a first communication device to a second communication device, comprising:

generating, at the first communication device, a security-sequence using a security-sequence-counter-value;

changing, at the first communication device, the security-sequence-counter-value to a new security-sequence-counter-value;

encrypting, at the first communication device, the security-sequence using a first-derived-session-key to provide an encrypted-security-sequence-counter-value;

providing, at the first communication device, a frame comprising the security-sequence and encrypted-security-sequence-counter-value;

transmitting a first-type frame from the first communication device to the second communication device;

decrypting, at the second communication device, the encrypted-security-sequence-counter-value using the first-derived-session-key to provide the security-sequence-counter-value;

configuring, at the second communication device, a security-sequence detector to detect a security-sequence using the security-sequence-counter-value;

setting a key-validity-counter-value in accordance with the number of first-type frames transmitted since the first-derived-session-key was updated; and updating the first-derived-session-key based on a master-session-key in response to the key-validity-counter-value reaching an update value.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Wideband Radio Frequency (RF) applications have been developed that are capable of accurate distance measurement between two or more wireless devices. These measurements are based on Time-of-Flight (ToF) calculations which are derived by accurate determination of departure and arrival times of RF frames, or packets, between two devices. RF packets travel at the speed of light and thus a calculated ToF allows determination of the distance between devices. Such a procedure is commonly called 'Ranging'. One practical application of Ranging is 'Distance Bounding' whereby ToF calculations are used to verify whether the distance between two devices is less than a predefined threshold, such as used for automotive Passive Keyless Entry (PKE) systems and other access control systems, as well as for contactless electronic payment systems.

Typically in an RF ranging system that employs the Time-of-Flight principle to determine the distance between two objects or markers on objects, a transceiver's transmitter sends out a waveform (commonly a chirp or a pulse), which is either reflected by an object or retransmitted by a second transceiver. Based on the amount of time it takes for the reflection or retransmission to reach the originating transceiver's receiver, the distance between the objects can be calculated.

Figure 1:
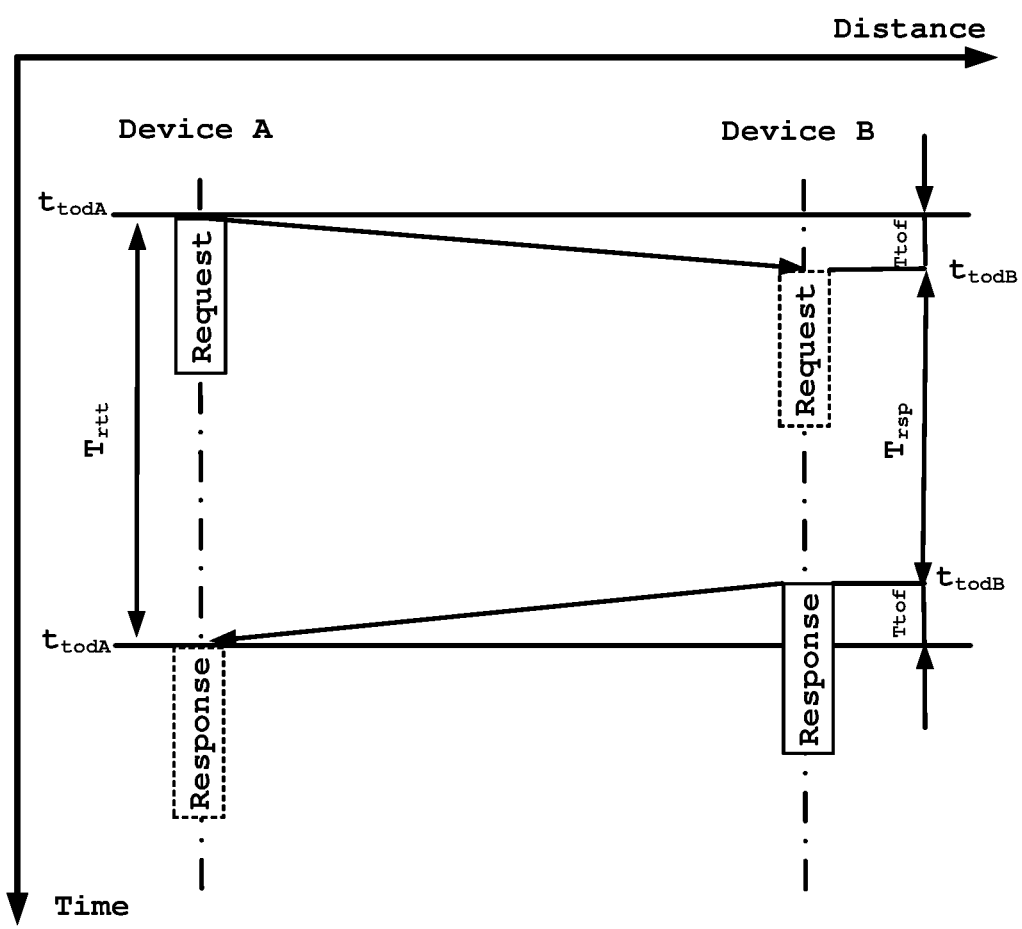
FIG. 1 shows a timing diagram for calculating a time-of-flight (ToF) between two devices.

FIG. 1 illustrates the principle of calculating the ToF between two communication devices, A and B, using Time-of-Arrival (ToA) and Time-of-Departure (ToD) measurements for RF packets transmitted there between. The procedure starts with Device A transmitting a 'Request' packet to Device B with a measured ToD ($t_{todA}$). Upon receipt of the Request packet, Device B measures the ToA ($t_{oaB}$), 1 and transmits a 'Response' packet back to Device A with a measured (or predetermined) ToD ($t_{todB}$). Upon receipt of the Response packet, Device A measures the ToA of the Response packet ($t_{toaA}$). From the measured (or otherwise derived) ToDs and ToAs, a roundtrip duration ($T_{rtt}=t_{todA}-t_{toaA}$) and a response duration ($T_{rsp}=t_{toaB}-t_{todB}$) can be calculated. The ToF between the devices A and B may then be estimated from the roundtrip duration and response duration: ToF=$0.5*(T_{rtt}-T_{rsp})$.

In order to cancel clock offsets between communication devices A and B, a double-sided ranging scheme may be employed.

Figure 2:
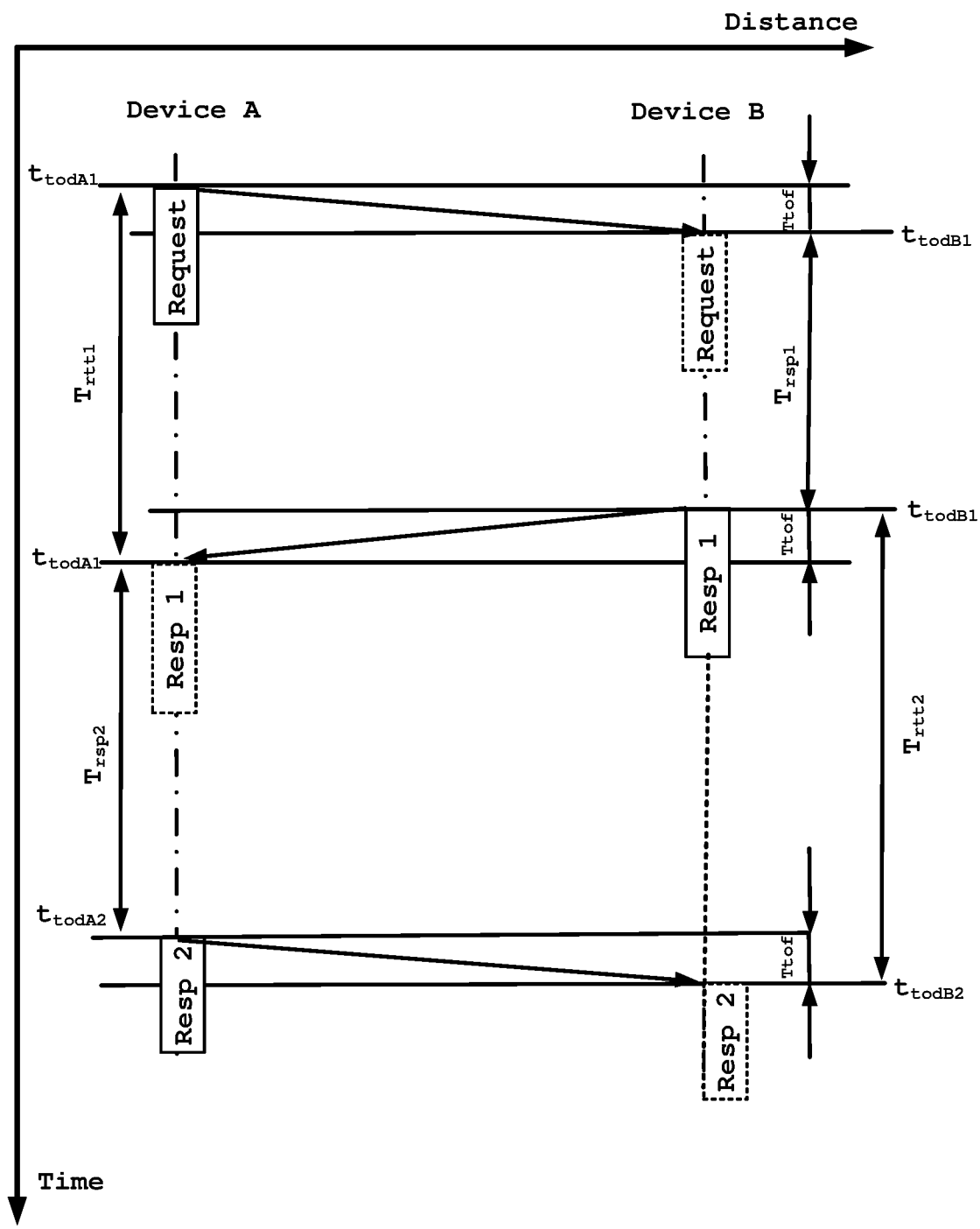
FIG. 2 shows a timing diagram for a double-sided time-of-flight (ToF) measurement between two devices.

FIG. 2 shows a timing diagram for a double-sided time-of-flight (ToF) measurement between two devices. In such schemes, data is transmitted from the device A to device B as described previously regarding FIG. 1 in that the procedure starts with Device A transmitting a 'Request' packet to Device B with a measured ToD ($t_{todA1}$). Upon receipt of the Request packet, Device B measures the ToA ($t_{oaB1}$) and transmits a first 'Response' packet (Resp1) back to Device A with a measured (or predetermined) ToD ($t_{todB}$). Following receipt of the first Response packet at a first response packet time of arrival ($t_{toaA}$), Device A transmits a second response (Resp2) at a second response time of departure ($t_{todA2}$). Following the time of flight (ToF), the second response (Resp2) is received at Device B at a second response time of arrival ($t_{toaB2}$).

An estimate of the time of flight may then be calculated based on roundtrip durations ($T_{rtt1}=t_{todA1}-t_{toaA1}$; $T_{rtt2}=t_{todA2}-t_{toaA2}$) and response durations ($T_{rsp1}=t_{toaB1}-t_{todB1}$; $T_{rsp2}=t_{toaB2}-t_{todB2}$), which results in reduced sensitivity to reference clock offsets when compared to single-sided ranging detailed above in relation to FIG. 1.

Figure 3A:
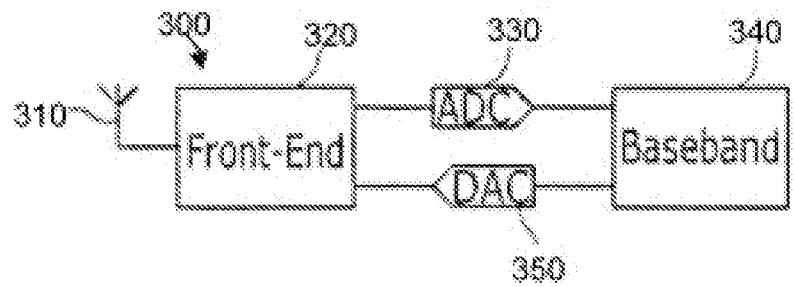
FIG. 3a illustrates a simplified block diagram of a part of a baseband processing module.

FIG. 3a illustrates a simplified block diagram of an example of part of a wireless radio frequency (RF) communication device 300. The communication device 300 includes an antenna 310 for receiving and transmitting RF signals over an air interface. The antenna 310 is coupled to front-end circuitry 320. The front-end circuit 320 typically consists of a receive path including, for example, a low noise amplifier, mixer and band-pass filter, and a transmit path including, for example, a mixer, filter and power amplifier. The receive path of the front-end circuit 320 is coupled to a baseband range-determining-module 340 of the communication device 300 via an analogue-to-digital converter (ADC) 330, via which received signals are passed from the front-end circuit 320 to the baseband range-determining-module 340. The transmit path of the front-end circuit 320 is coupled to the baseband range-determining-module 340 via a digital-to-analogue converter (DAC) 350, via which signals to be transmitted are passed from the baseband range-determining-module 340 to the front-end circuit 320.

The baseband range-determining-module 340 of the communication device 300 is arranged to perform Time-of-Arrival (ToA) measurements on data packets within received RF signals.

Figure 3B:
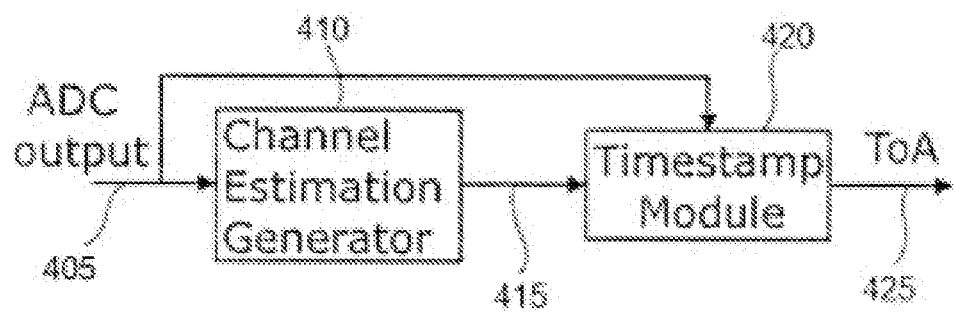
FIG. 3b illustrates a simplified block diagram for operating a range-determining-module for a transceiver.

FIG. 3b illustrates a simplified block diagram of a part of the baseband range-determining-module 340 arranged to perform ToA measurements on received-data-packets.

A channel estimate generator component 410 is arranged to receive the digital representation of the received RF signal 405 output by the ADC 330 and to generate channel estimate information 415 for a multipath transmission channel between the communication device 300 and a transmitter device (not shown) from which the received RF signal is being transmitted. A timestamp module 420 is arranged to receive the channel estimate information 415 generated by the channel estimate generation component 410, and the digital representation of the received RF signal 405, and to determine a ToA measurement 425 for a marker within a packet within the received RF signal based at least partly on the channel estimate information 415. For example, a signal received via a multipath channel will comprise a plurality of multipath components, which will show up in the taps of the channel impulse response estimate.

The timestamp module 420 may be arranged to identify a Line-of-Sight (LoS) component of the received signal based on the channel estimate information 415, and to determine a ToA measurement 425 for a marker within the packet for the LoS component of the received signal.

It will be appreciated that various mechanisms for performing channel estimation are known in the art, and a detailed discussion of the implementation of the channel estimation unit is outside of the scope of the present disclosure. The channel estimation component 410 may including a symbol correlator arranged to receive the digital representation of the received RF signal 405 output by the ADC 330 of FIG. 3a, and to perform cross-correlation of the received signal 405 with a reference pattern.

In passive keyless entry applications, it is typical for a system to be used in an environment where multiple other systems operate using a similar channel. For example, a number of vehicles may be parked together in a car park, each vehicle looking for its own key. In order to avoid conflict between systems, each system transmission may contain a unique identifier. The unique identifier may be encrypted in each transmission to avoid a third party snooping on a user by tracking a unique identifier associated with the user.

To ensure that the ranging is performed in a secure way, for example to prevent Cicada attacks, a target pattern in each transmitted frame may be generated as a security-sequence, or secure training sequence (STS) using a Cryptographically Secure Pseudo Random Number Generator (CSPRNG).

Figure 4:
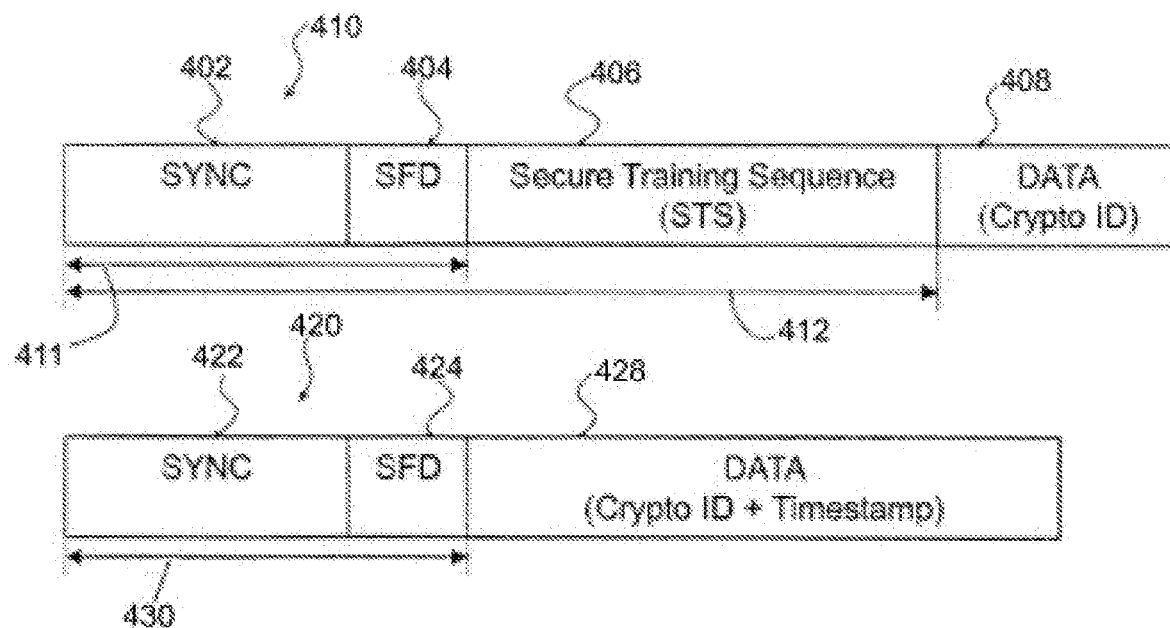
FIG. 4 illustrates a block diagram representation of a first-type frame and a second-type frame.

FIG. 4 illustrates a block diagram representation of a first-type frame 410 and a second-type frame 420. The first-type frame 410 may be used for ranging between a tag and an anchor and the second-type frame 420 may be used for data transmission between the tag and anchor.

The first-type frame 410 comprises sequential data structures including a synchronisation portion 402, a start frame delimiter 404, a secure training sequence (STS) 406 and a data payload 408. The synchronisation portion may contain a repeated pattern. The synchronisation portion 402 and subsequent start frame delimiter 404 provide a synchronisation header (SHR) 411 in a conventional manner. The synchronisation header 411 and subsequent secure training sequence (STS) 406 may be considered to provide a secure preamble 412 that can be used to identify the frame and perform ranging.

The security-sequence, or secure training sequence (STS) 406, of the first-type frame 410 is a cryptographically secure pseudo random number that may be provided by a cryptographically secure pseudo random number generator (CSPRNG) of the transmitter. The cryptographically secure pseudo random number may be generated using known encryption methodology. Use of the secure training sequence (STS) 406 enables the receiver to verify the authenticity of the transmitter by comparing the STS 406 that is received with a reference pattern. The comparison may be performed by a correlator that generates the reference value, or expected STS, based on an encryption key and a security-sequence-counter-value (seed value).

In order for the security-sequence to be secure and prevent against replay attacks, the security-sequence must be used only once. That is, each frame that it is transmitted must comprise a different STS to avoid defeating the security of the STS.

To ensure that a particular security-sequence is used only once, the security-sequence-counter-value related to the CSPRNG inside each of the transceivers may be continuously updated monotonically after the transmission of each frame. In this way, each counter value is used only once.

The receiving transceiver must know the current security-sequence-counter-value in order to determine the expected security-sequence to compare with the received security-sequence. In real applications, it is possible that two transceivers, or a tag transceiver and a set of anchor transceivers, are configured for polling while having the CSPRNG enabled for low system latency. In that case, the transceivers can be synchronized, while at the same time updating their counters for each new frame. This could be achieved by transmitting the security-sequence-counter-value within the first-type frame 410. However, the inclusion of a monotonic counter value within a frame would cause some information leakage, for example, how many times a car has been used in a day, or even used as a means to track a user as the counter value will be within a certain range. Therefore, in order to protect the user's privacy, the security-sequence-counter-value may not be transferred as plaintext (un-encrypted).

The security-sequence-counter-value is therefore encrypted to provide an encrypted-security-sequence-counter-value, which is transmitted as part of a data payload 408. Because the STS needs to be known in advance by the receiver before it can be used to generate an accurate Time-of-Arrival (ToA) estimate, and typically cannot be used to transmit data, synchronization of the CSPRNG seed is performed via the additional data payload 408. Once the data payload 408 has been successfully received, the receiver's CSPRNG seed can be synchronized and the next frame's STS 406 can be used for secure ranging.

The security-sequence-counter-value updates also ensure privacy because they prevent third-party observers from tracking a transceiver by looking for transmitted frames containing the static data.

A tag-identifier may also be transmitted in the data payload 408 of the first-type frame 410 so that collision or confusion with other devices can be prevented or reduced.

The second-type frame 420 also comprises a synchronisation header (SHR) 430 comprising a synchronisation portion 422 and a start frame delimiter 424. For the second-type frame 420, the synchronisation header (SHR) 430 also provides a preamble of the frame 420. The preamble is followed by a data payload 428, which may be used to return ranging information in the double-sided ranging scheme.

Figure 5A:
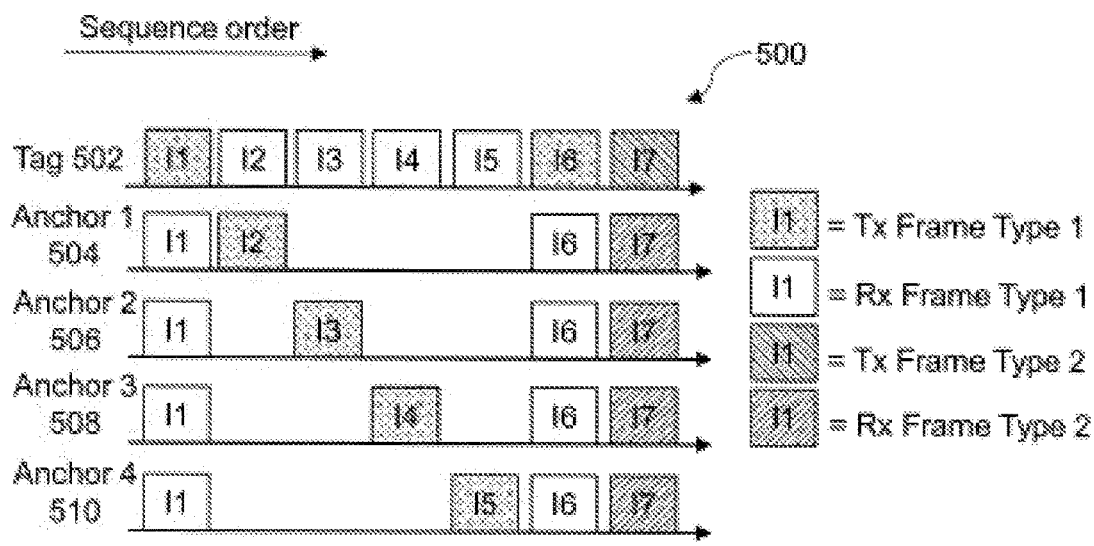
FIGS. 5a and 5b illustrate block diagrams of radio frame exchange schemes for transferring frames between a tag and a plurality of anchors.
Figure 5B:
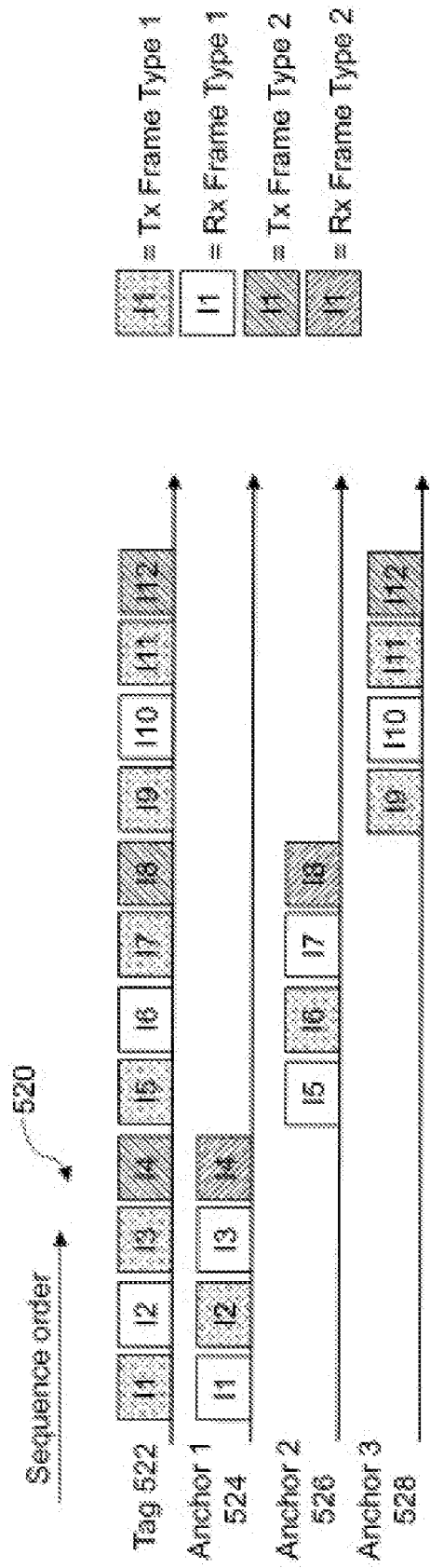

FIGS. 5a and 5b illustrate block diagrams of radio frame exchange schemes 500; 520 for transferring frames between a tag 502; 522 and a plurality of anchors 504, 506, 508, 510; 524, 526, 528. The radio frame exchange schemes 500; 520 use the first-type frames and second-type frames as described previously with reference to FIG. 4.

In FIG. 5a, the radio frame exchange scheme 500 is such that the tag 502 communicates with a plurality of anchors in parallel to provide an interleaved ranging block. The tag 502 sends a first-type frame I1 to the anchors 504, 506, 508, 510. Subsequently, each of the anchors 504, 506, 508, 510 sends a respective first response first-type frame I2, I3, I4, I5 back to the tag 502. Following receipt of the first response first-type frames I2, I3, I4, I5, the tag 502 sends a second response first-type frame I6 to the anchors 504, 506, 508, 510. In this way, a double-sided RF ranging scheme of the type described above with reference to FIG. 2 may be provided. Following the double-sided ranging frame exchange the tag 502 may send a second-type frame I7 to the anchors 504, 506, 508, 510. In this way, polling may be performed by regular transmission of "I1" frames by the tag, while repeated measurements are performed by repeated exchange of complete ranging blocks.

In FIG. 5b, the radio frame exchange scheme 520 is such that the tag 522 communicates with a plurality of anchors sequentially to provide a normal ranging block. The tag 522 sends a first-type frame I1, I5, I9 to the anchors 524, 526, 528. Subsequently, each of the anchors 524, 526, 528 sends a respective first response first-type frame I2, I6, I10 back to the tag 522. Following receipt of the first response first-type frames I2, I6, I10, the tag 522 sends a second response first-type frame I3, I7, I11 to the anchors 524, 526, 528. In this way, a double-sided RF ranging scheme of the type described above with reference to FIG. 2 may be provided. Following each double-sided ranging frame exchange the tag 522 may send a second-type frame I4, I8, I12 to the anchors 524, 526, 528. In this way, polling may be performed by regular transmission of "I1", "I5", and "I9" frames by the tag, while repeated measurement cycles are performed by repeated exchange of complete ranging blocks.

Figure 6A:
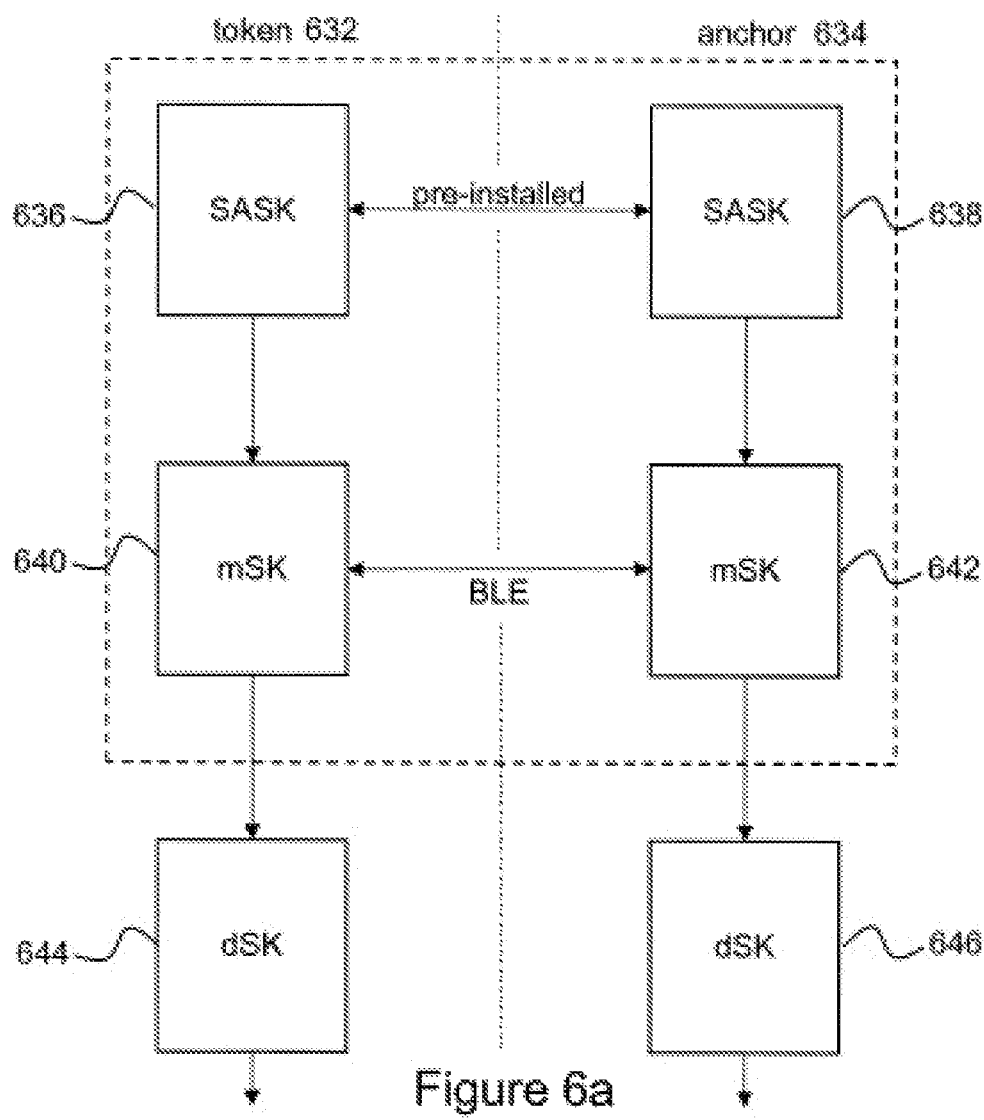
FIG. 6a illustrates a schematic representation of the generation of corresponding derived session keys by first and second communication devices.

FIG. 6a illustrates an encryption key management scheme for a first communication device 632 and a second communication device 634. In this example, the first communication device 632 is provided by a token, such as a car key, and the second communication device 634 is provided by an anchor, such as an in-vehicle receiver. The communication devices may communicate using impulse radio ultra-wide band (IR-UWB), RF transceivers for IEEE 802.15.4-2015 (including ZigBee), and Bluetooth Low Energy (BLE, or Bluetooth 5), for example.

A smart access session key (SASK) 636, 638 is pre-installed within the first and second communication devices 632, 634 and so may provide a permanent pairing between the first and second communication devices 632, 634. That is, the first and second communication devices 632, 634 have a common SASK 636, 638. In each of the first and second communication devices 632, 634, a master-session-key (mSK) 640, 642 is derived from the SASK 636, 638. The mSK 640, 642 of the first and second communication devices 602, 634 may be renewed via a Bluetooth low energy (BLE) connection, which may also be referred to as Bluetooth 5. For example, if the system has been inactive for a long time, a new mSK 640, 642 may be derived via BLE using the SASK 636, 638. This can reduce, or prevent, the likelihood of frequent use of the SASK 636, 638, thus ensuring its longevity.

Corresponding derived session keys (dSK) 644, 646 may in turn be derived from the respective master-session-keys 640, 642 of the first and second communication devices 632, 634. The derived session keys may be generated using a key derivation function (KDF), as is known in the art. The derived session keys 644, 646 may be used to enable secure communication between the first and second communication devices 632, 634.

For example, the derived session key 644 of the first communication device 632 may be used to encrypt portions of the first-type and second-types of frame described previously with reference to FIG. 4. The derived session key 646 of the second communication device 634 may be used to decrypt the corresponding portions of the first-type and second-type frames.

The generation of the master-session-key 640, 642 from the respective SASKs 636, 638 may be performed by a different functional unit to the derivation of the derived session keys 640, 646 from the respective master sessions keys 640, 642. The derivation of the derived session keys 644, 646 may be performed within a security module of an impulse radio ultra-wide band (IR UWB) circuit of a radio transceiver.

The radio frame exchange schemes described in relation to FIGS. 5a and 5b may be repeated partially or in whole at a rate of 10-20 Hz in some range finding applications. With such a repetition rate, depending on the bit width of the security-sequence-counter-value, the security-sequence-counter-value values might wrap-around and be re-used, so the root key of the CSPRNG (security-sequence-counter-value) might require a regular encryption key update by the system of FIG. 6a in order to remain secure.

If the security-sequence-counter-value bit width is relatively large, a more relevant reason to update the encryption key regularly is to protect against side channel attacks, in which an attacker records a power trace and after a given number of traces might recover the key. Regularly updating the encryption key that encrypts the STS counter protects against such attacks.

In IR-UWB RF Ranging systems, such as the one described above, it is desirable to improve security and link budget while reduce current consumption, latency, and system cost. Therefore, it may be desirable to regularly update encryption keys without incurring excessive link budget and system availability penalty. Especially in multi-anchor systems without long-term availability of absolute timing references, this can be challenging.

Several solutions can be considered, with associated drawbacks:

1. Not updating the key—in which case security is ultimately lost.
2. Updating the key using an absolute timing reference, however, absolute timing references are not available in all applications (which is why the security-sequence-counter-value has to be transmitted between the devices).
3. Splitting the key into keys for the counter, the STS generation, and a separate key for encrypting additional (timestamp) data. All these keys can be derived from a common master key, as discussed below in relation to FIG. 6b. Such a scheme can, for example, be implemented according to NIST SP 800-108 § 5.1 (available electronically at http://dx.doi.org/10.6028/NIST.SP.800-108), using a Cipher-based Message Authentication Code Pseudo Random Function (CMAC PRF).

Figure 6B:
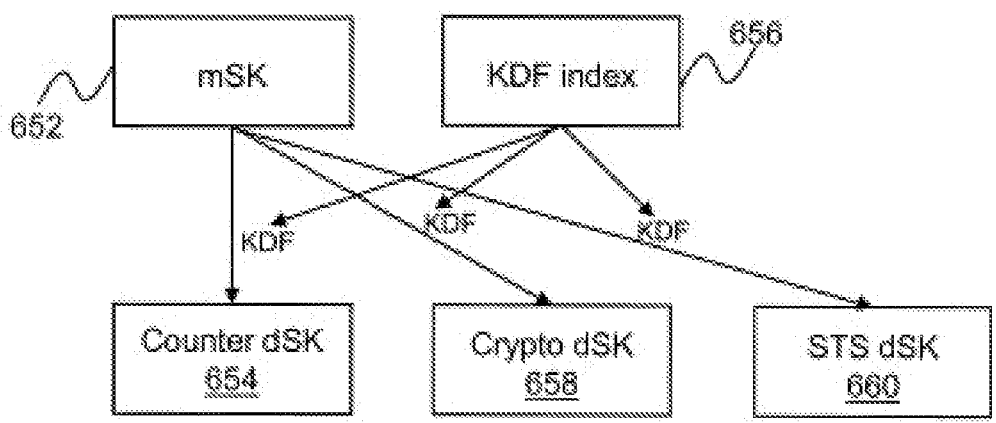
FIG. 6b illustrates a schematic representation of the generation of derived session keys to encrypt/decrypt the frames described with reference to FIG. 4.

FIG. 6b illustrates a scheme for key derivation from a master-session-key (mSK) 652 for encrypting/decrypting the first-type frame and second-type frame described with reference to FIG. 4. A counter-derived-session-key (Counter dSK) 654 is provided from the master-session-key 652 using a key derivation function (KDF) and a KDF index 656. The counter-derived-session-key (Counter dSK) 654 may be used by the first and second communication devices to encrypt and decrypt a security-sequence-counter-value to provide an encrypted-security-sequence-counter-value in the data payload of the first-type frames. A different key derivation function (KDF) is also applied to the master-session-key 652 using the KDF index 656 to provide a crypto-derived-session-key 658. The crypto-derived-session-key (Counter dSK) 658 may be used to encrypt the data payload of the frames of the second-type. A further key derivation function (KDF) is also applied to the master-session-key 652 using the KDF index 656 to provide a STS derived session key 660. The STS derived session key (STS dSK) 660 may be used to encrypt the secure training sequence (STS) of the first-type frames. In general, a different KDF or different KDF key may be used to generate each of the counter-derived-session-key (Counter dSK) 654, crypto-derived-session-key (Counter dSK) 658 and STS derived session key (STS dSK) 660. A scrambling of a KDF index may be provided such that all three keys are different. One such scrambling method is to apply an XOR to all three keys with pre-shared pseudo-random bit patterns.

In this way, the crypto-derived-session-key (Crypto dSK) 658, which may be considered to be a second-derived-session-key, is different from the counter-derived-session-key (Counter dSK) 654, which may be considered to be a first-derived-session-key. The STS derived session key (STS dSK) 660 may be considered to be a third-derived-session-key and is different from both the first-derived-session-key and the second-derived-session-key.

One advantage of splitting the keys as described with reference to FIG. 6b is to give a higher protection against a side-channel attack to the Crypto dSK and STS dSK than the Counter dSK because they are used less regularly than the Counter dSK. This will give higher protection to the second-type frame confidentiality and authenticity which contains positioning information than to first-type frame, which has the main security objective of protecting the privacy of the user by protecting confidentiality of the CSPRNG Seed (security-sequence-counter-value). This allows the update rate of all keys to be further reduced.

The relative frequency of use of the first-, second- and third-derived-session-keys is provided in the table below. The construction of first-type frames and second-type frames using the first-, second- and third-derived session keys is discussed further below with reference to FIGS. 7a and 7b.

| Attribute | Rate of usage | Protection afforded |
|---|---|---|
| third-derived-session-key (root key of CSPRNG - STS dSK) | 1 per first-type frame | STS sequence → cicada attacks |
| Security-sequence-count-value (STS index - monotonic CSPRNG seed) | 2 per first-type frame (one for STS, one for CID) and 1 per second-type frame (one for CID) | Uniqueness of STS → replay attacks |
| first-derived-session-key (CID key - Counter dSK) | 1 per second-type frame and 1 per second-type frame | Confidentiality of STS index → Customer privacy. Collision → limit key update rate |
| second-derived-session-key (Crypto (payload) key - Crypto dSK) | 1 per second-type frame | Confidentiality and authenticity of timestamps → ranging |

Figure 7A:
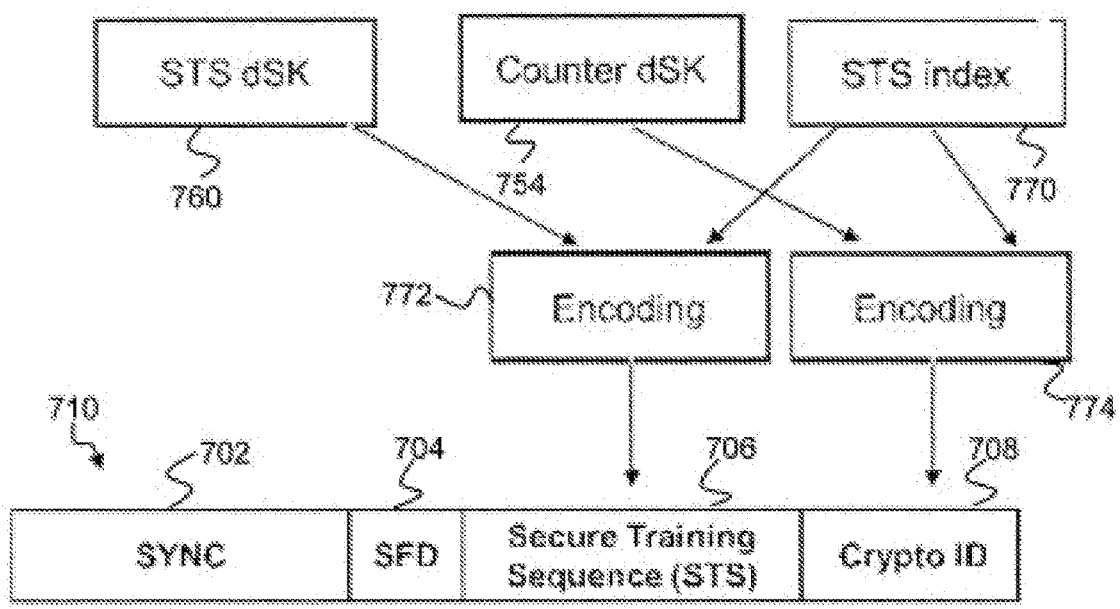
FIG. 7a illustrates a schematic representation of the generation of derived session keys to encrypt/decrypt first-type frames.

FIG. 7a illustrates a schematic representation of the generation of derived session keys to encrypt/decrypt first-type frames. The first-type frame 710 comprises sequential data structures including a synchronisation portion 702, a start frame delimiter 704, a secure training sequence (STS) 706 and a data payload (Crypto ID) 708.

The secure training sequence (STS) 706, or security-sequence, may be encoded/decoded 772 using a security-sequence-derived-session-key (STS dSK) 760 and a security-sequence-counter-value (STS index) 770. The encrypted-security-sequence-counter-value in the data payload (Crypto ID) 408 may be encoded/decoded 774 from/to the security-sequence-counter-value (STS index) 770 using a counter-derived-session-key (Counter dSK) 754.

Figure 7B:
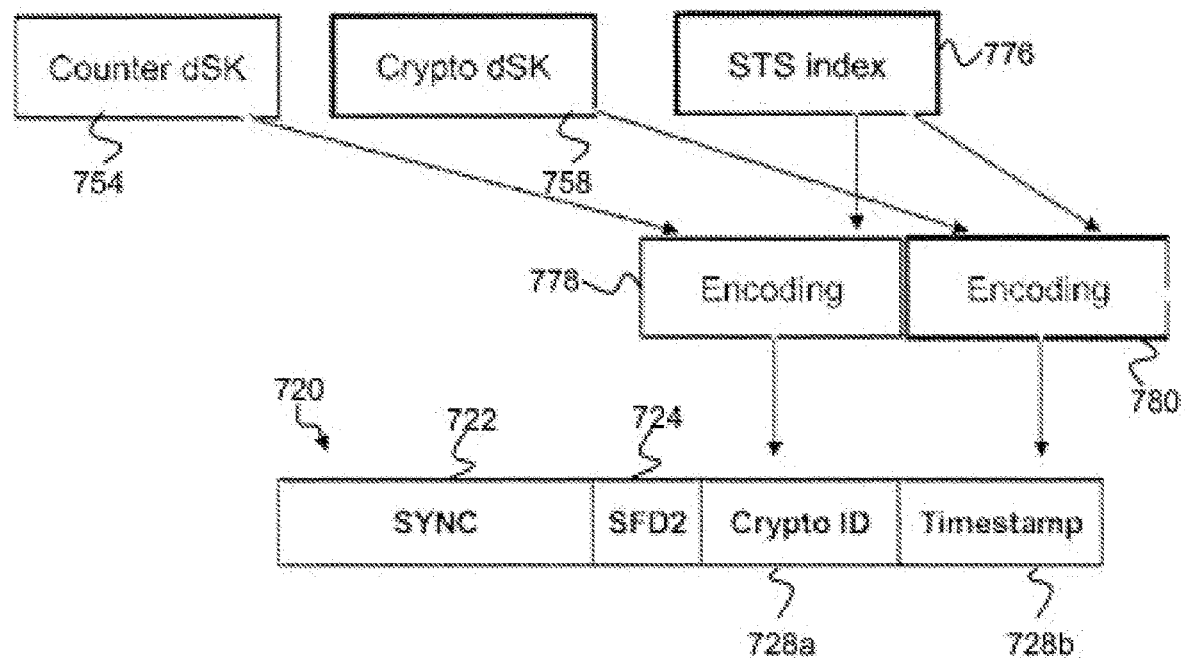
FIG. 7b illustrates a schematic representation of the generation of derived session keys to encrypt/decrypt second-type frames.

FIG. 7b illustrates a schematic representation of the generation of derived session keys to encrypt/decrypt frames of the second-type. The second-type frame 720 comprises sequential data structures including a synchronisation portion 722, a start frame delimiter 724 and a data payload 728a, 728b. The data payload contains a Crypto ID portion 728a and a timestamp portion 728b.

The encrypted-security-sequence-counter-value in the data payload (Crypto ID) 728a may be encoded/decoded 778 from/to the security-sequence-counter-value (STS index) 776 using a counter-derived-session-key (Counter dSK) 754. The timestamp portion 728b may be encoded/decoded 780 using the crypto-derived-session-key (Crypto dSK) 758 and a counter value, such as the security-sequence-counter-value (STS index) 776. Reuse of the security-sequence-counter-value (STS index) 776 for this purpose avoids the need for another counter and potentially associated synchronization requirements.

The counter-derived-session-key (Counter dSK) 754 may be generated by a security-module of both of the first communication device or the second communication device based on a common key derivation function and a first-derived-session-key-index-value maintained by the respective communication modules, as described previously with reference to FIG. 6a.

In accordance with the schemes illustrated in FIGS. 6b, 7a and 7b, a security-module of a communication device may be configured to:
 derive a Crypto dSK 658 based on the master-session-key (mSK 652) and a second-derived-session-key-index-value (KDF index 652) using a second-key derivation function (KDF); and
 encode/decode 780 time stamp information 728b in the data payload of the second-type frames 720 using the second-derived-session-key 758.

Advantages derived from the encoding/decoding scheme are discussed below with reference to FIGS. 8a and 8b for a system comprising first and second communication devices.

Figure 8A:
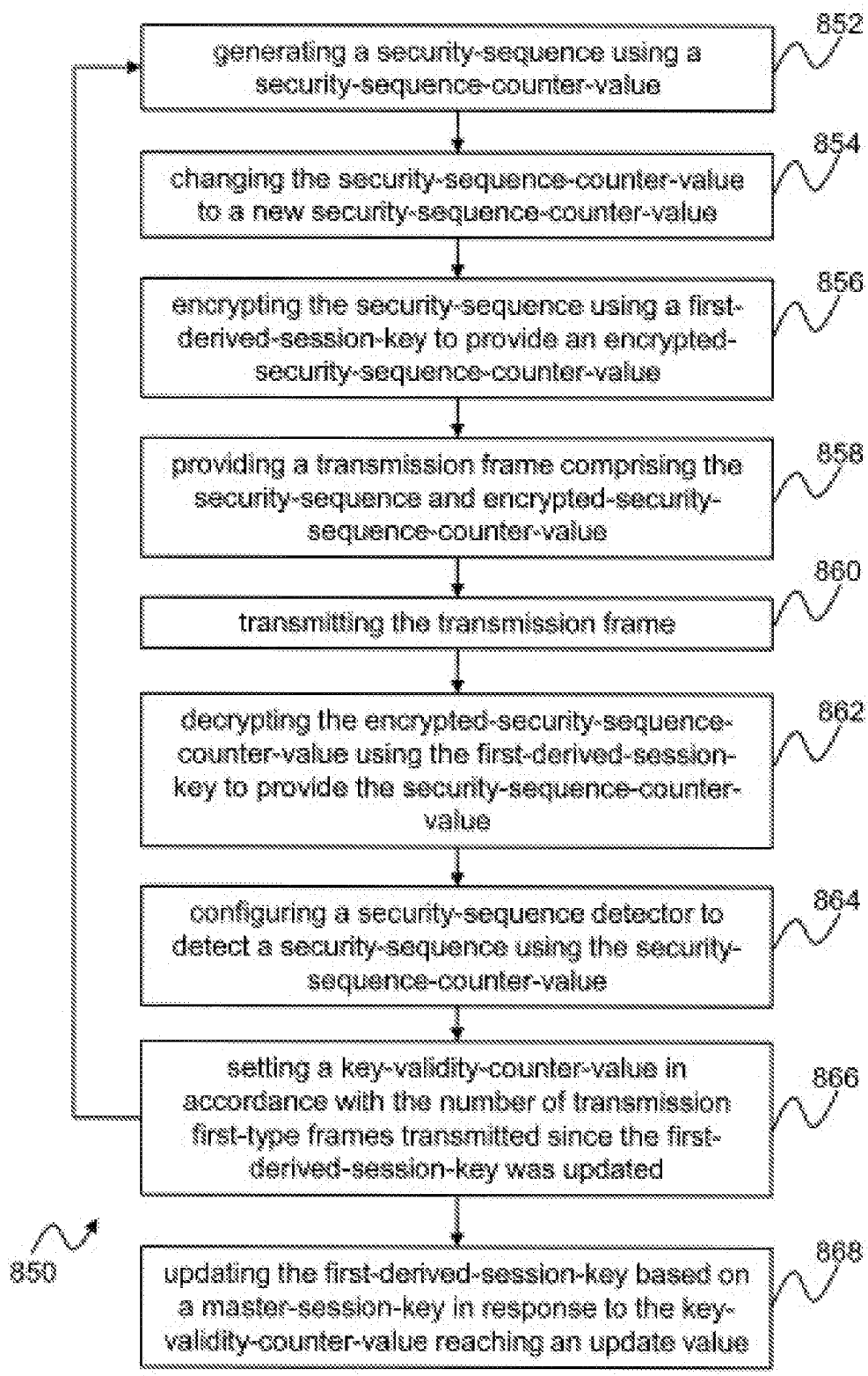
FIG. 8a illustrates a method for operating a system to transmit frames from a first communications device to a second communications device.

FIG. 8a illustrates a method 850 for operating a system to transmit a plurality of frames from a first communication device to a second communication device.

Before initializing the method 850 over IR-UWB, the first communication device and second communication device may use Bluetooth Low Energy communication to determine that the first device is proximal to the second device.

The method 850 comprises iteratively:
 generating 852, at the first communication device, a security-sequence using a security-sequence-counter-value;
 changing 854, at the first communication device, the security-sequence-counter-value to a new, unique security-sequence-counter-value;
 encrypting 856, at the first communication device, the security-sequence using a first-derived-session-key to provide an encrypted-security-sequence-counter-value;
 providing 858, at the first communication device, a first-type frame comprising the security-sequence and encrypted-security-sequence-counter-value;
 transmitting 860 the first-type frame from the first communication device to the second communication device;

decrypting 862, at the second communication device, the encrypted-security-sequence-counter-value using the first-derived-session-key to provide the security-sequence-counter-value;

configuring 864, at the second communication device, a security-sequence detector such as a correlator to detect a security-sequence of a subsequent frame using the security-sequence-counter-value; and setting 866 a key-validity-counter-value in accordance with the number of transmission first-type frames transmitted since the first-derived-session-key was last updated.

In response to the key-validity-counter-value reaching an update value, thereby indicating that a new first-derived-session-key is required, the first-derived-session-keys at the first and second communication devices are updated 868 based on a master-session-key using a first-key-derivation-function and a first-derived-session-key-index-value, as described previously regarding FIGS. 6b, 7a and 7b.

Setting 866 the key-validity-counter-value may be performed by the first or second communication device, or at both devices. A security-module of the first or second communication device may be configured to set 866 the key-validity-counter-value in accordance with the number of first-type frames transmitted by the first transmitter module since the first-derived-session-key was updated. The security-module in some examples may be configured to maintain the key-validity-counter-value by incrementing a key-validity-counter in response to the transmission of each frame. That is, the each time a frame is transmitted or received.

The security-module of either the first communication device or the second communication device may be configured to generate a synchronisation flag in response to the key-validity-counter-value reaching the update value. The communication device comprising such a security-module may then transmit a first-derived-session-key-update-signal to the other communication device, in response to the setting of the synchronisation flag, as described in further detail below regarding the example in FIG. 8b.

Figure 8B:
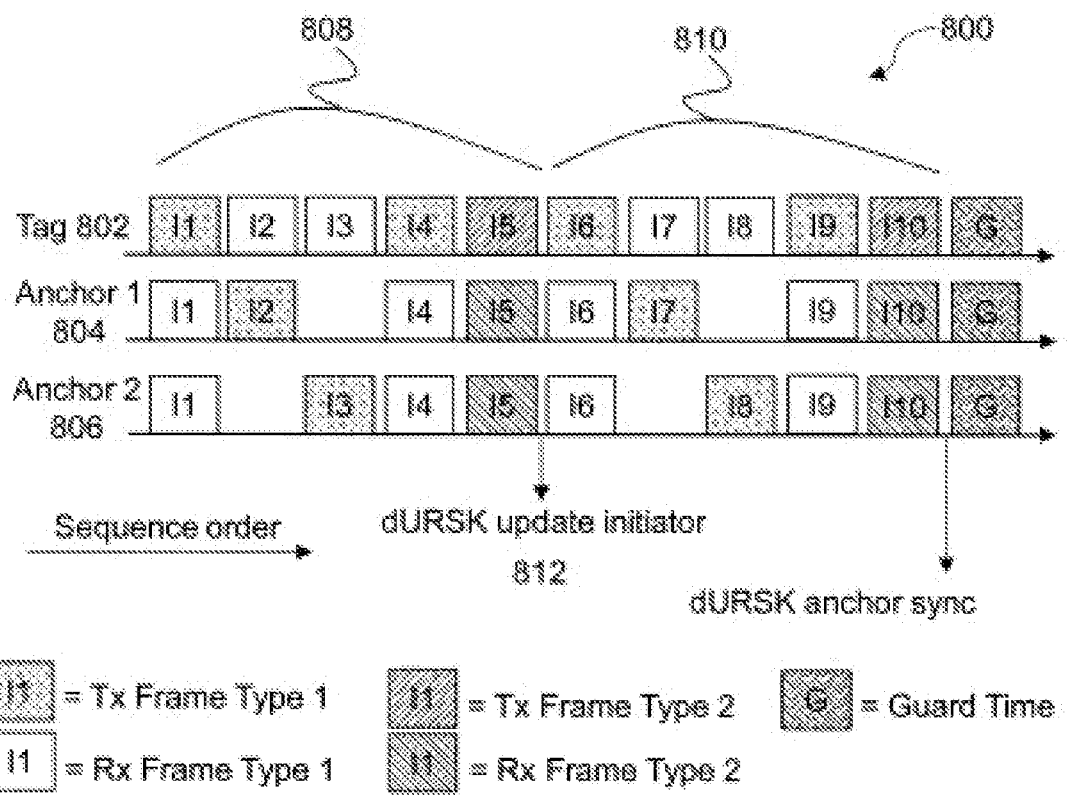
FIG. 8b illustrates a block diagram of an improved radio frame exchange scheme for transferring frames between a tag and a plurality of anchors.

FIG. 8b illustrates a block diagram of a radio frame exchange scheme 800 for transferring frames between a tag 802 and a plurality of anchors 804,806 using the method described with reference to FIG. 8a for frames encoded as described in FIGS. 7a and 7b.

The tag 802 is an example of a first communication device. Each of the anchors 804, 806 is an example of a second communication device.

The exchange illustrated includes a first exchange 808 and a second exchange 810. The first exchange 808 in this example is a parallel exchange that is similar to the exchange described previously with reference to FIG. 5a, and uses first-type frames and second-type frames as described previously with reference to FIG. 4. A similar arrangement could be achieved with exchanges that are based on a sequential exchange such as the frame exchange described previously with reference to FIG. 5b.

The first exchange 808 comprises the first communication device 802 sending a first-type frame I1 to the second communication devices 804, 806. Subsequently, each of the second communication devices 804, 806 sends a respective first response first-type frame I2, I3 back to the first communication device 802. Following receipt of the first response first-type frames I2, I3, the first communication device 802 sends a second response first-type frame I4 to the second communication devices 804, 806. In this way, a double-sided RF ranging scheme of the type described above with reference to FIG. 2 may be provided. Following the double-sided ranging frame exchange the first communication device 802 may send a second-type frame I5 to the second communication devices 804, 806. The second-type frame I5 may contain a time-stamp data determined by the first communication device based on the double-sided RF ranging interaction.

An update of the derived session key 812 may be initiated following the first exchange 808. The first and second communication devices may be configured to synchronise updating of the first-derived-session-key in response to the key-validity-counter-value reaching an update value as described previously with reference to FIG. 8a. Synchronisation of updating may be achieved over a different communication channel to the communication of first-type frames and second-type frames. For example, the synchronisation of the updating may be performed on a secure channel using a Bluetooth Low Energy (BLE) connection. Alternatively, synchronisation of the updating may be achieved using the second exchange 810 using the communication channel that is used for the communication of first-type frames and second-type frames.

As shown in FIG. 8b, the second exchange 810 takes place following the determination that an update of the derived session key 812 is required. The second exchange provides a dummy exchange that is conducted following initiation of updating of the first-derived-session-key. During this period the derived session keys of the first and second communication devices may be out of sync and so the second exchange 810 may not be used to securely range the first and second communication devices. Instead, the second exchange 810 may merely provide a handshake protocol in which ranging information from the dummy exchange is discarded by the first and second communication devices. However, in order to obfuscate from any eavesdropping third parties that the derived session key is being updated, the second exchange 810, during the updating of the derived session key, may have a similar format to the first exchange 808.

The second exchange 810 comprises the first communication device 802 sending a request frame I6 to the second communication devices 804, 806. Subsequently, each of the second communication devices 804, 806 sends a respective response frame I7, I8 back to the first communication device 802, Following receipt of the response frames I7, I8, the first communication device 802 sends a second response first-type frame I9 to the second communication devices 804, 806.

The dummy exchange may be used to confirm that both devices are aware that one or more dSKs need to be updated. For example, one or more of the frames of the second exchange may comprise a first-derived-session-key-update-flag. When confirmation is established, a "guard time" following the second exchange can be reserved to allow all second communication devices to update their first-derived-session-keys. To improve privacy protection, additional dummy frames may be exchanged during the guard time in order to obfuscate from any eavesdropping third party that the operation of the system has changed.

In case the request frame I6 is not received by any of the second communication devices 804, 806, a new attempt to establish a dummy exchange may be repeatedly made by the first communication device following non-receipt of response frames I7, I8 from the second communication device until confirmation can be achieved.

In some examples, dummy exchanges may be reserved exclusively for synchronising the update of the first-derivedsession-key. Therefore, it may not be necessary for the first communication device 802 to transmit a second-type frame I10 to the second communication devices 804, 806. However, including the second-type frame I10 in the dummy exchange may help to ensure privacy because it ensures that the structure of the dummy frame appears similar to a normal frame to any eavesdropping third party.

The second communication devices may be provided in a network, such as a wired or wireless connection of anchors in a vehicle. In such cases, a dummy second-type frame (such as I10 in FIG. 8b) in the dummy exchange may comprise an identifier signifying which of the second devices have transmitted a first response first-type frame to the first device in the dummy exchange. The second communication devices may synchronise their first-derived-session-key over the network so that a current first-derived-session-key or first-derived-session-key-index is provided to any of the plurality of second devices that are present in the network where the first response first-type frame associated with that second device has not been received by the first device. In this way, the dummy exchange may contain additional data signifying which anchors have been recognized by the tag in order that the anchors that have not been recognized by the tag are updated, via either a wired or wireless alternative communications channel. Examples of wired alternative communications channels include in-Vehicle Network (IVN) such as a Controller Area Network (CAN), Local Interconnect Network (LIN) or Ethernet. Examples of wireless alternative communications channels include (for example, if the nodes can see each other via UWE, or via companion ICs implementing BLE, or sub-GHz ISM radio, Will, Zigbee, or other wireless communications). The amount of data communicated over the alternative communications channel for first-type frames and second-type frames may be reduced. This may improve the performance of band-width limited applications. A table may be stored in all or a subset of the anchors to indicate the course of action (i.e., which anchor is responsible for sending a message to which unrecognized anchor) for each possible combination of recognized anchors.

The security of the first-derived-session-key (Counter dSK) provided by an AES128 key used to encrypt a security-sequence-counter having a 32-bit length may be considered to be secure for about 4.3 billion ($2^{32}$) uses, until the counter overflows and the same counter values are recycled. However, in practice because of side channel attacks based on current consumption timing, or EMI, the Counter dSK may only securely encrypt the counter for a few millions of frames maximum, depending on cryptographic units implementation and attacker capabilities. Assuming 1 million, at a frame transmission rate of 20 Hz, which is typically in a PKE automotive application, the security-sequence-counter would become insecure after around 13 hours.

The first-derived-session-key (Counter dSK) may be updated using an update value of less than 100% of the number of frames for which the first-derived-session-key (Counter dSK) remains secure (90%, for example). In this way, the update value may be set at a number of frames that guarantees or assures that the first-derived-session-key is secure.

For example, the update value may be significantly below a maximum value of times that a first-derived-session-key (Counter dSK) has been used that would result in the security of the key being expected to be compromised. If the first-derived-session-key (Counter dSK) is secure when the key update is initiated then multiple attempts at establishing an update of the first-derived-key may be allowed without the security of the key being compromised. In such cases, the dummy exchange may contain an additional second-type frame I10 because secure ranging can still be performed. In such examples, a key update may be initiated by the tag (first communication device). This may be done either via an agreed counter value or with an (encrypted and possibly authenticated) update flag transmitted in a different part of the polling frame.

Alternatively, the first-derived-session-key (Counter dSK) may be updated using an update value of the 100% or greater of the number of frames for which the first-derived-session-key (Counter dSK) remains secure. In this way, the update value may be set at a number of frames that is greater than a value for which the security of the first-derived-session-key (Counter dSK) can be guaranteed or assured. For example, the update may be initiated when the encrypted-security-sequence-counter, and therefore the number of times that a first-derived-session-key (Counter dSK) has been used, has already exceeded the maximum value for which cryptographic security is expected to be maintained. In this case, the Counter dSK is compromised, but the Crypto dSK and STS dSKs are not necessarily compromised because more first-type frames are transmitted than second-type frames: typically, many polling frames remain unanswered and the protocol then does not arrive at the stage where a second-type frame is transmitted. Therefore, for a relatively short amount of time, privacy of the tag cannot be guaranteed, while key longevity is maximized or improved (i.e., update overhead minimized or reduced) and Crypto dSK and STS dSK security keys remains unaffected.

Figure 9:
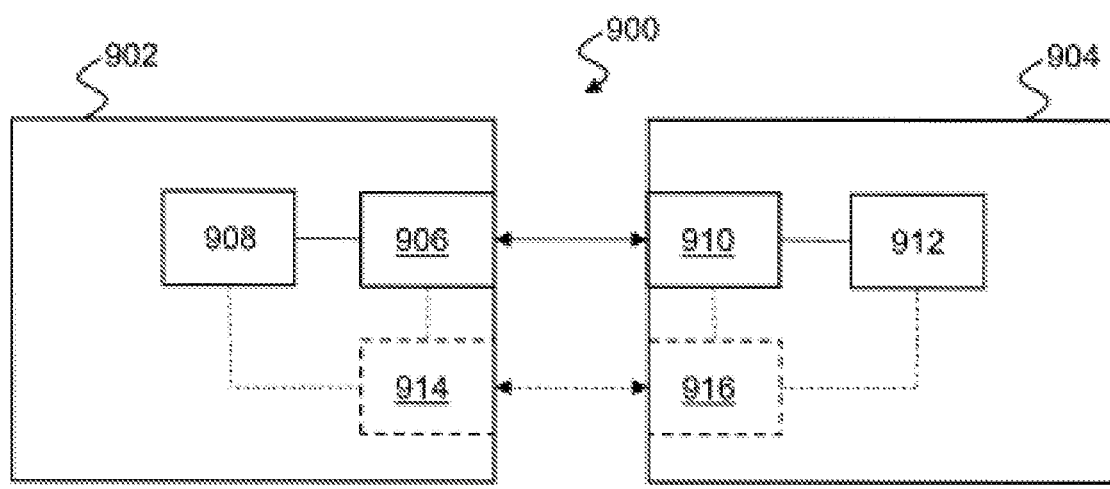
FIG. 9 illustrates a simplified block diagram of system comprising a first communication device and a second communication device.

FIG. 9 illustrates a system comprising a first communication device 902 and a second communication device 904. The first and second communication devices 902, 904 each provide a transceiver module 906, 910 for implementing the transmission scheme described previously with reference to FIGS. 8a and 8b.

The first and second communication devices 902, 904 each comprise a security-module.

Each security module is configured, in a transmission mode, to:
  generate the security-sequence for each first-type frame using a security-sequence-counter-value, in which a different security-sequence-counter-value is used for each frame;
  derive a first-derived-session-key based on a master-session-key and a first-derived-session-key-index-value using a first-key derivation function in response to a key-validity-counter-value reaching an update value indicating that a new first-derived-session-key is require; and
  encrypt the security-sequence to provide the encrypted-security-sequence-counter-value using the first-derived-session-key.

Each security module is configured, in a reception mode, to:
  derive a first-derived-session-key based on a master-session-key and a first-derived-session-key-index-value using a first-key derivation function in response to a key-validity-counter-value reaching an update value indicating that a new first-derived-session-key is require;
  in which the encrypted-security-sequence-counter-value of the frames are encrypted using the first-derived-session-key.

The transceiver modules 906, 910 of the first and second communication devices 902, 904 are configured to exchange first-type frames and second-type frames using a IR-UWB connection.

The first and second communication devices 902, 904 may optionally also each comprise an alternative communication channel transceiver 914, 916. The alternative communication channel transceivers 914, 916 may be configured to exchange key information, or to provide an indication of whether the first communication device is proximal to the second communication device. The alternative communication channel transceivers 914, 916 may operate over a Bluetooth 5 connection.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A first communication device comprising:
a transmitter implemented using at least one hardware processor and configured to transmit:
first-type frames, each first-type frame comprising a security-sequence and an encrypted-security-sequence-counter-value, and
second-type frames, each second-type frame comprising an encrypted-security-sequence-counter-value and an encrypted timestamp; and
a security device configured to:
derive a counter-derived-session-key based on a master-session-key and a key-validity-counter-value using a first-key-derivation-function;
derive a crypto-derived-session-key based on the master-session-key and the key-validity-counter-value using a second-key-derivation-function that is different from the first-key-derivation-function;
derive a security-sequence-derived-session-key based on the master-session-key and the key-validity-counter-value using a third-key-derivation-function that is different from the first-key-derivation-function and different from the second-key-derivation-function;
generate the security-sequence for each first-type frame using a security-sequence-counter-value and the security-sequence-derived-session-key, in which a different security-sequence-counter-value is used for each first-type frame;
generate the encrypted-security-sequence-counter-value for each first-type frame and for each second-type frame using the security-sequence-counter-value and the counter-derived-session-key; and
generate the encrypted timestamp for each second-type frame using the security-sequence-counter-value and the crypto-derived-session-key, wherein:
the first-type and second-type frames are receivable by a second communication device of a plurality of second communication devices, wherein the second communication device is configured to:
derive the counter-derived-session-key based on the master-session-key and the key-validity-counter-value using the first-key-derivation-function;
derive the crypto-derived-session-key based on the master-session-key and the key-validity-counter-value using the second-key-derivation-function;
derive the security-sequence-derived-session-key based on the master-session-key and the key-validity-counter-value using the third-key-derivation-function;
decrypt the security-sequence of each first-type frame and each second-type frame using the security-sequence-derived-session-key;
decrypt the encrypted-security-sequence-counter-value of each first-type frame using the counter-derived-session-key; and decrypt the encrypted timestamp of each second-type frame using the crypto-derived-session-key.

2. A second communication device comprising:
a receiver implemented using at least one hardware processor and configured to receive:
   first-type frames, each first-type frame comprising (i) a security-sequence generated using a security-sequence-counter-value, in which the security-sequence-counter-value is different for each first-type frame and (ii) an encrypted-security-sequence-counter-value, and
   second-type frames, each second-type frame comprising an encrypted-security-sequence-counter-value and an encrypted timestamp; and
a security device configured to:
   derive a counter-derived-session-key based on a master-session-key and a key-validity-counter-value using a first-key-derivation-function;
   derive a crypto-derived-session-key based on the master-session-key and the key-validity-counter-value using a second-key-derivation-function that is different the from first-key-derivation-function;
   derive a security-sequence-derived-session-key based on the master-session-key and the key-validity-counter-value using a third-key-derivation-function that is different from the first-key-derivation-function and different from the second-key-derivation-function;
   decrypt the security-sequence of each first-type frame and each second-type frame using the security-sequence-derived-session-key;
   decrypt the encrypted-security-sequence-counter-value of each first-type frame using the counter-derived-session-key; and
   decrypt the encrypted timestamp of each second-type frame using the crypto-derived-session-key, wherein a first communication device is configured to:
      derive the counter-derived-session-key based on the master-session-key and the key-validity-counter-value using the first-key-derivation-function:
      derive the crypto-derived-session-key based on the master-session-key and the key-validity-counter-value using the second-key-derivation-function that is different from the first-key-derivation-function;
      derive the security-sequence-derived-session-key based on the master-session-key and the key-validity-counter-value using the third-key-derivation-function that is different from the first-key-derivation-function and different from the second-key-derivation-function;
      generate the security-sequence for each first-type frame using the security-sequence-counter-value and the security-sequence-derived-session-key, in which the different security-sequence-counter-value is used for each first-type frame;
      generate the encrypted-security-sequence-counter-value for each first-type frame and for each second-type frame using the security-sequence-counter-value and the counter-derived-session-key;
      generate the encrypted timestamp for each second-type frame using the security-sequence-counter-value and the crypto-derived-session-key;
      transmit the first-type frames, each first-type frame comprising the security-sequence and the encrypted-security-sequence-counter-value, and
      transmit the second-type frames, each second-type frame comprising the encrypted-security-sequence-counter-value and the encrypted timestamp.

3. The communication device of claim 1, in which the security device is configured to set the key-validity-counter-value in accordance with the number of first-type frames transmitted since the counter-derived-session-key was updated.

4. The communication device of claim 1, in which the security device is configured to maintain the key-validity-counter-value by incrementing a key-validity-counter in response to the transmission of each frame.

5. The communication device of claim 4, in which the security device is configured to generate a synchronisation flag in response to the key-validity-counter-value reaching the update value, and in which the communication device transmits a counter-derived-session-key update signal in response to the setting of the synchronisation flag.

6. The communication device of claim 1, in which the update value is set at a number of frames such that the counter-derived-session-key is secure in each frame.

7. The communication device of claim 1, in which the update value is set at a number of frames that is greater than a value for which the counter-derived-session-key is secure in each frame.

8. A system comprising:
the first communication device of claim 1, and
the plurality of second communication devices of claim 1,
   wherein each of the plurality of second communication devices includes
   a receiver implemented using at least one hardware processor and configured to receive:
      first-type frames, each first-type frame comprising (i) the security-sequence generated using the security-sequence-counter-value, in which the security-sequence-counter-value is different for each first-type frame and (ii) the encrypted-security-sequence-counter-value, and
      second-type frames, each second-type frame comprising the encrypted-security-sequence-counter-value and the encrypted timestamp; and
   a second security device configured to:
      derive the counter-derived-session-key based on the master-session-key and the key-validity-counter-value using the first-key-derivation-function;
      derive the crypto-derived-session-key based on the master-session-key and the key-validity-counter-value using the second-key-derivation-function that is different from the first-key-derivation-function;
      derive the security-sequence-derived-session-key based on the master-session-key and the key-validity-counter-value using the third-key-derivation-function that is different from the first-key-derivation-function and from the second-key-derivation-function;
      decrypt the security-sequence of each first-type frame and each second-type frame using the security-sequence-derived-session-key;
      decrypt the encrypted-security-sequence-counter-value of each first-type frame using the counter-derived-session-key; and
      decrypt the encrypted timestamp of each second-type frame using the crypto-derived-session-key.

9. The system of claim 8, in which the first and second communication devices are configured to synchronise updating of the counter-derived-session-key in response to the key-validity-counter-value reaching an update value.

10. The system of claim 9, in which a dummy exchange is conducted following initiation of updating of the counter-derived-session-key, in which ranging information from the dummy exchange is discarded by the first and second communication devices.

11. The system of claim 10, in which the second communication devices are provided in a network,
in which the dummy exchange comprises a dummy second-type frame having an identifier signifying the one or more of the second communication devices which have transmitted a first response first-type frame to the first communication device in the dummy exchange, and
in which the second communication devices are configured to synchronise the counter-derived-session-key over the network so that a current counter-derived-session-key or counter-derived-session-key-index is provided to any of the plurality of second communication devices associated with a first response first-type frame that has not been received by the first communication device.

12. The system of claim 9, in which the first-type frames and second-type frames are impulse radio ultra-wide band, IR-UWB, frames.

13. A method for operating a system to transmit first-type and second-type frames from a first communication device to a second communication device, the method comprising:
generating, by the first communication device, a first-type frame comprising a security-sequence and an encrypted-security-sequence-counter-value;
transmitting the first-type frame from the first communication device to the second communication device;
processing, by the second communication device, the first-type frame;
generating, by the first communication device, a second-type frame comprising an encrypted-security-sequence-counter-value and an encrypted timestamp;
transmitting the second-type frame from the first communication device to the second communication device; and
processing, by the second communication device, the second-type frame, wherein:
the first communication device generates the first-type frame by:
deriving a counter-derived-session-key based on a master-session-key and a key-validity-counter-value using a first-key-derivation-function;
deriving a security-sequence-derived-session-key based on the master-session-key and the key-validity-counter-value using a third-key-derivation-function that is different from the first-key-derivation-function;
generating the security-sequence for each first-type frame using a security-sequence-counter-value and the security-sequence-derived-session-key, in which a different security-sequence-counter-value is used for each first-type frame; and
generating the encrypted-security-sequence-counter-value for each first-type frame using the security-sequence-counter-value and the counter-derived-session-key;
the second communication device processes the first-type frame by:
deriving a counter-derived-session-key based on a master-session-key and a key-validity-counter-value using the first-key-derivation-function;
deriving a security-sequence-derived-session-key based on the master-session-key and the key-validity-counter-value using the third-key-derivation-function;
decrypting the security-sequence for each first-type frame using the security-sequence-derived-session-key; and
decrypting the encrypted-security-sequence-counter-value for each first-type frame using the counter-derived-session-key;
the first communication device generates the second-type frame by:
deriving a counter-derived-session-key based on a master-session-key and a key-validity-counter-value using the first-key-derivation-function;
deriving a crypto-derived-session-key based on the master-session-key and the key-validity-counter-value using a second-key-derivation-function that is different from the first-key-derivation-function and different from the third-key derivation-function;
generating the encrypted-security-sequence-counter-value for each second-type frame using a security-sequence-counter-value and the counter-derived-session-key; and
generating the encrypted timestamp for each second-type frame using the security-sequence-counter-value and the crypto-derived-session-key; and
the second communication device processes the second-type frame by:
deriving a counter-derived-session-key based on a master-session-key and a key-validity-counter-value using the first-key-derivation-function;
deriving a crypto-derived-session-key based on the master-session-key and the key-validity-counter-value using the second-key-derivation-function;
decoding the encrypted-security-sequence-counter-value for each second-type frame using the counter-derived-session-key; and
decoding the encrypted timestamp for each second-type frame using the crypto-derived-session-key.

\* \* \* \* \*